J. S. BAIRD.
STEERING KNUCKLE.
APPLICATION FILED JAN. 23, 1919.

1,355,377. Patented Oct. 12, 1920.

WITNESSES

INVENTOR
J. S. Baird
BY
ATTORNEYS

UNITED STATES PATENT OFFICE.

JAMES SPRUCE BAIRD, OF DENVER, COLORADO.

STEERING-KNUCKLE.

1,355,377. Specification of Letters Patent. Patented Oct. 12, 1920.

Application filed January 23, 1919. Serial No. 272,659.

*To all whom it may concern:*

Be it known that I, JAMES S. BAIRD, a citizen of the United States, and a resident of Denver, in the county of Denver and State of Colorado, have invented a new and Improved Steering-Knuckle, of which the following is a description.

My invention relates to the steering means for the front wheels of automobiles or other vehicles and has for its general object to provide an improved knuckle designed to be stronger than the steering knuckles generally employed as well as insuring the element of safety to an increased degree by reason of the construction and arrangement of the parts, such as will resist side stresses as well as jars and jolts, and designed to better distribute the burden of the load weight imposed thereon.

More specifically, I have in view to provide an embodiment of the invention reflecting practical considerations with respect to simplicity of the assemblage as well as the convenience of installation and of disassembling the parts when required for repairs or the like.

Reference is to be had to the accompanying drawings forming a part of this specification, it being understood that the drawings are merely illustrative of one example of the invention.

Figure 1:
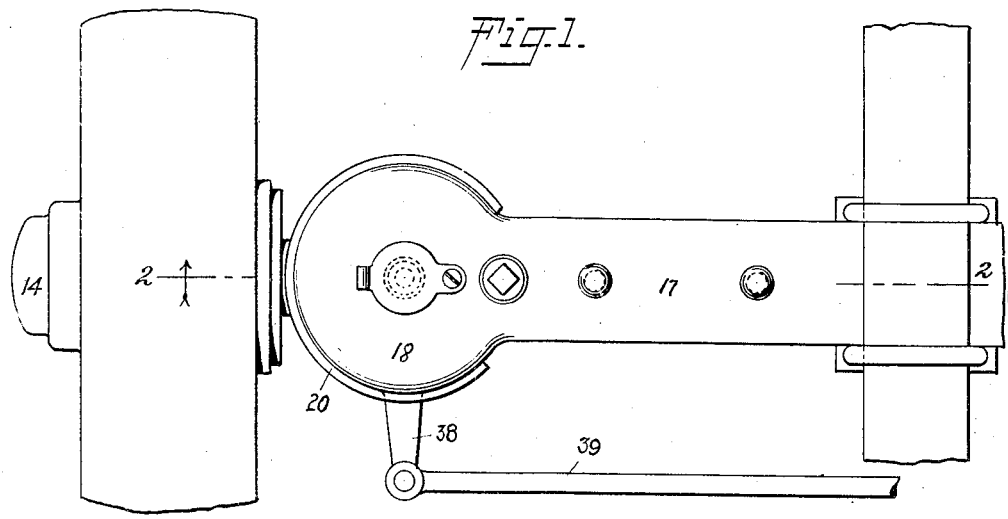
Figure 1 is a plan view of a portion of an axle equipped with steering means embodying my invention.
Figure 2:
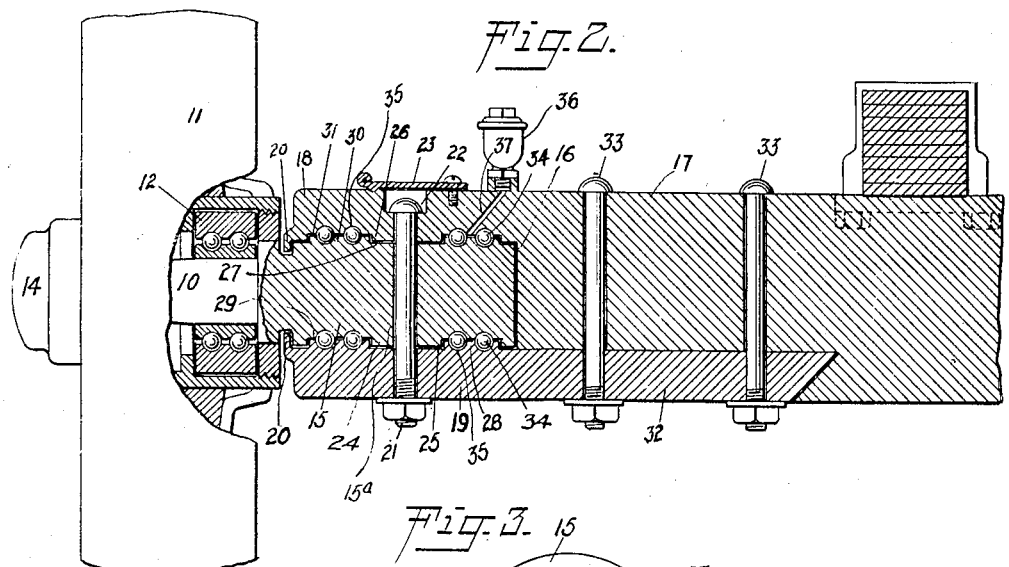
Fig. 2 is a vertical section thereof as indicated by the line 2—2, Fig. 1.
Figure 3:
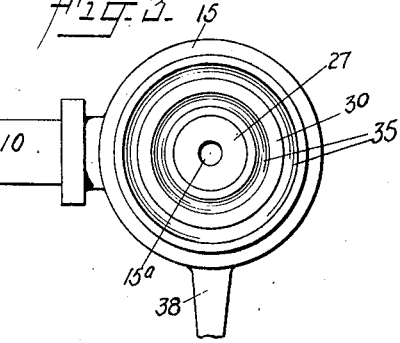
Fig. 3 is a plan view of my improved axle spindle and knuckle.

In carrying out my invention in accordance with the illustrated example an axle spindle 10 is provided adapted to receive a wheel 11 of any approved form, there being indicated a known form of bearing elements between the spindle and wheel and designated generally by the numeral 12, said spindle having as usual a threaded end 13 to receive a cap nut 14.

Said spindle 10 is formed integral with my improved knuckle 15 which is in the form of a turn-table presenting upper and lower bearing bases. Said turn-table is received in an end opening or recess 16 formed longitudinally in the fixed axle 17, whereby the axle at the top overlies the turn-table as at 18, and underlies said table as at 19. The fixed axle 17 is formed with arcuate flanges 20 extending in opposite directions from the end members 18, 19 of said axle and overlapping the turn-table 15 as a shield or housing at the opposed bearing surfaces of said turn-table and the members 18, 19. A vertical pivot bolt 21 extends through the members 18, 19, of the axle and through the turn-table 15 whereby the latter will be free to be turned about its own axis to swing the spindle 10 through the desired angle for steering. The member 18 has a countersink or depression 22 at the bolt 21 to form an oil cup, said cup being closed by a suitable cover 23.

I provide an interlocking engagement between the fixed members 18, 19 and the turn-table 15, these members being disposed about the axis of said turn-table so that while turning movement is permitted the turn-table, displacing strains in other directions will be resisted. Thus, in the present example, there is a central projecting zone 24 on said turn-table about the pin hole 15ª therein and a corresponding depression 25 in the bearing face of the member 19. Similarly, on the under side of the top member 18 there is a corresponding depending annular zone 26 accommodated in a depression 27 in the upper bearing face of the turn-table. Also, I form on the bearing face of the member 19 an annular raised zone 28 concentric with the pivot pin, there being a corresponding annular groove 29 in the under face of the turn-table. Similarly, the upper bearing face of the turn-table has an annular raised zone 30 outside of the member 26 and depression 27 and concentric with the pivot pin, said last mentioned zone being accommodated in a corresponding annular groove 31 formed in the opposed under face of the member 18. Ball bearings 34 are provided at the upper and lower faces of the turn-table 15, annular races 35 for said balls being presented by the opposed surfaces at the raised members 28, 30 and the grooves 29, 31. The interlocking of the knuckle as thus provided, it will be clear, resists displacement of the turn-table and spindle in the plane of the turn-table except only as a turning movement may be imparted thereto, while the rigid members 18, 19 of the axle 17 resist vertical bending strains imposed on the knuckle by the load. In order to provide for the entrance and removal of the turn-table 15 the member 19 at the under side of said table is provided with a detachable axle piece 32 secured to the body of the axle 17 by bolts 33 or equivalent means, the pivot bolt 21 serving as an additional securing means for said detachable member 32. Lubricating means additional to the cup 22 may be provided by a cup 36 which leads to the upper face of the turn-table 15 through an oblique duct 37 formed in the member 18.

The knuckle may be given any steering movement in any suitable manner, there being indicated in the drawing the usual steering lever 38 and a portion of the usual cross arm or rod 39.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A device for vehicle wheels, an axle spindle, a turn-table rigid with said spindle, an axle having an end opening receiving said turn-table and having horizontal arcuate flanges overlying and underlying the said turn-table, one of said flanges being removable, a vertical pivot extending through said turn-table and the overlying and underlying portions of the axle, and means to operate said turn-table for swinging the spindle through an angle for steering.

2. A steering device for vehicle wheels, including an axle spindle, a turn-table rigid with said spindle, an axle having in its ends a longitudinal opening receiving said turn-table and forming a bearing therefor in which the turn-table may have movement about its own axis to swing said spindle through a desired angle for steering, a vertical pivot pin for said turn-table, the upper and lower faces of said turn-table and the opposed surfaces of the axle presenting a plurality of interlocking members resisting movement of said turn-table other than a turning movement about its axis, arcuate housing members on said axle and overlapping the turn-table, and means for operating said turn-table.

JAMES SPRUCE BAIRD.